(12) United States Patent
Lacks et al.

(10) Patent No.: US 11,142,130 B2
(45) Date of Patent: Oct. 12, 2021

(54) MOTOR VEHICLE CARGO SUPPORT SYSTEM, RAILS THEREFOR AND METHODS OF CONSTRUCTION THEREOF

(71) Applicant: Lacks Enterprises, Inc., Grand Rapids, MI (US)

(72) Inventors: Ryan Lacks, Grand Rapids, MI (US); Paul Nikandrou, Caledonia, MI (US); Brian Wojtczak, Grand Rapids, MI (US); Thomas Hawkins, Lowell, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 183 days.

(21) Appl. No.: 16/419,435

(22) Filed: May 22, 2019

(65) Prior Publication Data

US 2019/0359143 A1    Nov. 28, 2019

Related U.S. Application Data

(60) Provisional application No. 62/674,741, filed on May 22, 2018.

(51) Int. Cl.
*B60R 9/04* (2006.01)
*B32B 1/08* (2006.01)
*B62D 25/06* (2006.01)
*B60R 9/052* (2006.01)

(52) U.S. Cl.
CPC .............. *B60R 9/04* (2013.01); *B32B 1/08* (2013.01); *B60R 9/052* (2013.01); *B62D 25/06* (2013.01); *B32B 2262/106* (2013.01); *B32B 2605/08* (2013.01); *B60Y 2304/03* (2013.01)

(58) Field of Classification Search
CPC .. B60R 9/04; B60R 9/052; B60R 9/08; B60R 9/10; B60R 9/12; B62D 25/06; B60Y 2304/03; B32B 1/08; B32B 2605/08; B32B 2262/106
See application file for complete search history.

(56) References Cited

U.S. PATENT DOCUMENTS 5,914,163 A * 6/1999 Browne .................. B32B 27/08
                                                     428/36.1
7,004,537 B2 * 2/2006 Unger ...................... B60R 9/04
                                                     296/210

* cited by examiner

*Primary Examiner* — Walter Aughenbaugh
(74) *Attorney, Agent, or Firm* — Dickinson Wright, PLLC (57) ABSTRACT

A cargo support system and cargo support rails therefor are provided. The cargo support rails include a tubular wall extending along a longitudinal axis between opposite ends. The tubular wall includes a plurality of carbon fibers and a fibrous mat bonded to one another by a cured resin.

19 Claims, 8 Drawing Sheets

MOTOR VEHICLE CARGO SUPPORT SYSTEM, RAILS THEREFOR AND METHODS OF CONSTRUCTION THEREOF

CROSS-REFERENCE TO RELATED APPLICATION

This application claims the benefit of U.S. Provisional Application Ser. No. 62/674,741, filed May 22, 2018, which is incorporated herein by reference in its entirety.

TECHNICAL FIELD

The present disclosure relates generally to motor vehicle cargo support systems, and more particularly to motor vehicle cargo support systems having laterally spaced cargo support rails for operable securement of cargo thereon and to methods of construction thereof.

BACKGROUND OF THE DISCLOSURE

With recent efforts directed toward energy conservation along with the continuing escalation of fuel prices, the automotive industry has put an emphasis on increasing the fuel economy of vehicles that are put onto the road. Efforts to improve the fuel economy of vehicles have resided in improving the operation and efficiency of their engines, reducing the weight of their bodies and chassis, and improving the aerodynamic characteristics of their bodies. While great strides have been made in enhancing vehicle fuel economy as a result of improvements in these areas, there is still significant room for further advancement.

The impact of the cargo support systems, including roof rail systems that extend along an upper surface of a motor vehicle roof, and their effect on vehicle aerodynamics, weight, and thus, on vehicle fuel economy, has been largely overlooked, and thus, remains problematic. While there have been efforts to design and manufacture lighter weight cargo support systems, such as through the removal of material therefrom via secondary machining operations, problems and challenges associated with solving the problems with regard to aerodynamics, weight, and fuel economy remain.

In addition to the problems noted above, further problems exist with regard to the cost to manufacture and assemble cargo support systems. Typically, cargo support systems comprise numerous parts, including parts made of plastic and/or metal that must be made separately and then assembled to one another and then secured to the outer surface of the motor vehicle, such as to the upper surface or roof of the motor vehicle. Although these systems generally function to support cargo as intended, they come with the drawbacks noted above, namely, lacking aerodynamic contours and being relatively bulky and heavy. Further yet, the aforementioned systems are relatively complicated to assemble, with the multiple components needing to be properly aligned, mated and fastened with one another, typically via secondary fasteners, which ultimately adds time and cost to the process of assembly, while the cost of manufacture is also increased due to having to make and stock the separate components and fasteners.

As a consequence, a need remains to provide a vehicle cargo support system that provides an ability to carry a cargo load as intended that is reduced in weight relative to known systems, is cost efficient in manufacture and assembly, is aerodynamic, without diminishing the robustness, durability and functionality of the vehicle cargo system, and that exhibits a long and useful life.

SUMMARY OF THE DISCLOSURE

This section provides a general summary of the disclosure and is not intended to be considered a complete and comprehensive listing of the disclosure's full scope or all of its aspects, advantages, objectives and/or features.

It is an aspect of the present disclosure to provide a motor vehicle cargo support system and cargo support rails therefore that address at least those drawbacks discussed above, and thus, that enhances a motor vehicle's fuel efficiency, is aesthetically pleasing, is lightweight, aerodynamic, relatively easy and cost efficient to manufacture and assemble, robust, durable and exhibits a long and useful life.

In accordance with the above and other aspects of the present disclosure, a motor vehicle cargo support system and cargo support rails therefore are provided. The cargo support rails, in accordance with one aspect, include a tubular wall extending generally along a longitudinal axis between opposite ends. The tubular wall includes a plurality of continuous carbon fibers bonded to a separate fibrous mat by a resin that is cured, wherein the continuous carbon fibers extend from one of the opposite ends to the other of the opposite ends.

In accordance with another aspect of the present disclosure, the fibrous mat can be impregnated by the resin, wherein the resin is subsequently cured.

In accordance with another aspect of the present disclosure, each of the continuous carbon fibers can extend in unidirectional fashion with one another from one of the opposite ends to the other of the opposite ends.

In accordance with another aspect of the present disclosure, the tubular wall can be provided with an outer surface that extends, at least in part, along an arcuate path from one of the opposite ends toward the other of the opposite ends.

In accordance with another aspect of the present disclosure, the tubular wall can be provided with an outer surface that extends in its entirety along an arcuate path from one of the opposite ends to the other of the opposite ends.

In accordance with another aspect of the present disclosure, the arcuate path along which the outer surface of the tubular wall can extend can have a constant radius of curvature.

In accordance with another aspect of the present disclosure, the outer surface of the tubular wall having a constant radius of curvature can form a bottom surface of the tubular wall, with the bottom surface being configured to abut a roof panel of the motor vehicle having a mating constant radius of curvature.

In accordance with another aspect of the present disclosure, the fibrous mat can include randomly oriented carbon fibers.

In accordance with another aspect of the present disclosure, a motor vehicle cargo support system is provided. The motor vehicle cargo support system includes a plurality of tubular walls extending along a longitudinal axis between opposite ends, with the tubular walls including a plurality of continuous carbon fibers bonded to a fibrous mat by a resin. The continuous carbon fibers extend from one of the opposite ends to the other of the opposite ends. Further, a roof wall extends between the tubular walls as an integral piece of material with the tubular walls. The roof wall includes a fibrous material impregnated with a resin.

In accordance with another aspect of the present disclosure, the fibrous mat can be impregnated by the resin, wherein the resin is subsequently cured.

In accordance with another aspect of the present disclosure, each of the continuous carbon fibers can extend in unidirectional fashion with one another from one of the opposite ends to the other of the opposite ends.

In accordance with another aspect of the present disclosure, the roof wall can include a plurality of continuous carbon fibers extending between opposite ends of the roof wall and a fibrous mat impregnated by a resin.

In accordance with another aspect of the present disclosure, the plurality of continuous carbon fibers of the roof wall can extend in unidirectional fashion with one another from one of the opposite ends to the other of the opposite ends.

In accordance with another aspect of the present disclosure, the fibrous mat of the rails and the fibrous mat of the roof wall can be provided as a continuous, monolithic sheet of material.

In accordance with another aspect of the present disclosure, a method of constructing a cargo support rail is provided. The method includes providing a plurality of continuous carbon fibers and a fibrous mat and bonding the continuous carbon fibers to the fibrous mat with a resin. Then, pulltruding the continuous carbon fibers and the fibrous mat through a heated die and forming an elongate tubular wall.

In accordance with another aspect of the present disclosure, the method of constructing the cargo support rail can include impregnating the fibrous mat with the resin prior to the heated die to enhance the rigidity and strength of the cargo support rail.

In accordance with another aspect of the present disclosure, the method of constructing the cargo support rail can include impregnating the fibrous mat and the continuous carbon fibers with the resin prior to the heated die to further enhance the rigidity and strength of the cargo support rail.

In accordance with another aspect of the present disclosure, the method of constructing the cargo support rail can include extending the plurality of continuous carbon fibers in unidirectional fashion with one another from one of the opposite ends to the other of the opposite ends prior to bonding the continuous carbon fibers to the fibrous mat.

In accordance with another aspect of the present disclosure, the method of constructing the cargo support rail can include shaping the elongate tubular wall after pulltruding the continuous carbon fibers and the fibrous mat through the heated die.

In accordance with another aspect of the present disclosure, the method of constructing the cargo support rail can include performing the shaping by disposing an elongate member into a cavity of the tubular wall.

In accordance with another aspect of the present disclosure, a method of constructing a cargo support system is provided. The method includes providing a plurality of continuous carbon fibers and a fibrous mat and bonding the continuous carbon fibers and the fibrous mat to one another with a resin. Then, pulltruding the continuous carbon fibers and the fibrous mat through a heated die and forming a plurality of elongate tubular walls interconnected in laterally spaced relation with one another by a generally planar wall.

In accordance with another aspect of the present disclosure, the method of constructing the cargo support system can include impregnating the fibrous mat with the resin prior to the heated die to enhance the rigidity and strength of the cargo support rail.

In accordance with another aspect of the present disclosure, the method of constructing the cargo support system can include impregnating the fibrous mat and the continuous carbon fibers with the resin prior to the heated die to further enhance the rigidity and strength of the cargo support rail.

In accordance with another aspect of the present disclosure, the method of constructing the cargo support system can include extending the plurality of continuous carbon fibers in unidirectional fashion with one another from one of the opposite ends to the other of the opposite ends prior to bonding the continuous carbon fibers to the fibrous mat.

In accordance with another aspect of the present disclosure, the method of constructing the cargo support system can further include shaping the elongate tubular walls and/or the generally planar wall after pulltruding the continuous carbon fibers and the fibrous mat through the heated die.

In accordance with another aspect of the present disclosure, the method of constructing the cargo support system can further include fully curing the resin after pulltruding the continuous carbon fibers and the fibrous mat through the heated die.

BRIEF DESCRIPTION OF THE DRAWINGS

These and other aspects, features and advantages of the present disclosure will be readily appreciated, as the same becomes better understood by reference to the following detailed description when considered in connection with the accompanying drawings wherein.

DETAILED DESCRIPTION OF EXAMPLE EMBODIMENTS

In general, example embodiments of a cargo carrying system and method of construction thereof in accordance with the teachings of the present disclosure will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail, as they will be readily understood by the skilled artisan in view of the disclosure herein.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Figure 1:
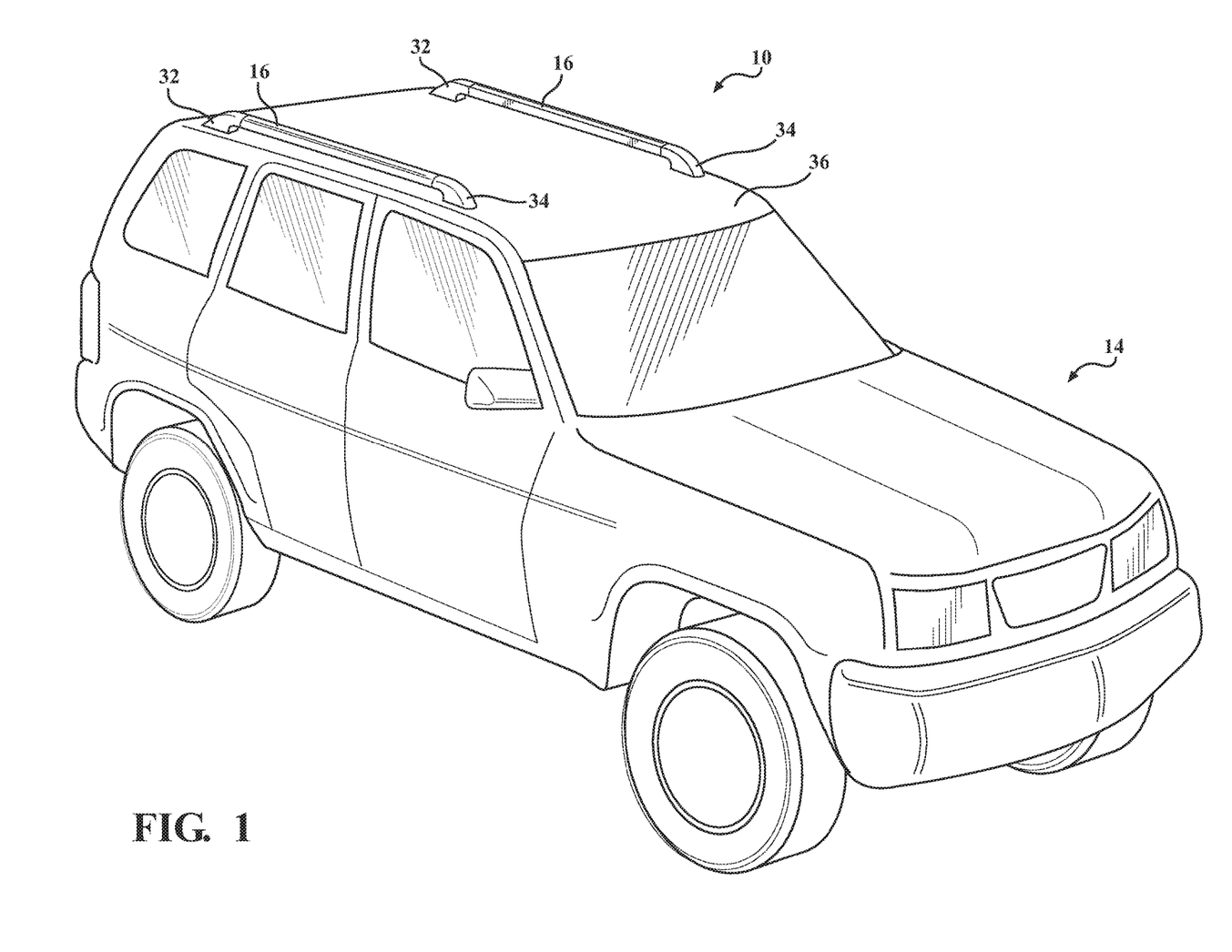
FIG. 1 is a perspective view of a motor vehicle including a cargo carrying system according to an aspect of the present disclosure.
Figure 2:
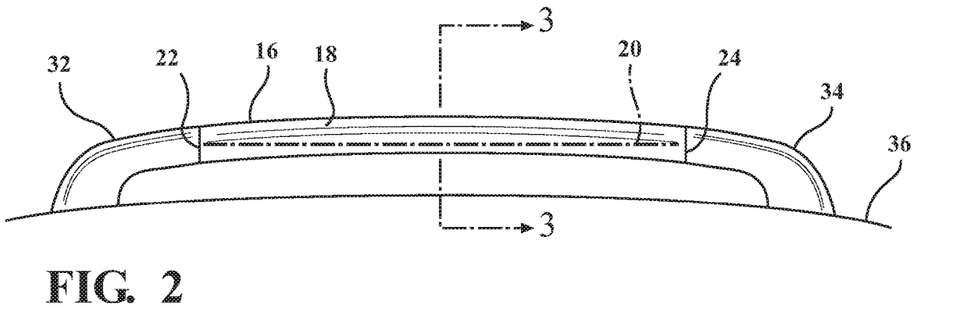
FIG. 2 is a side view of a roof rail of the cargo carrying system of FIG. 1 according to one aspect of the present disclosure.
Figure 3:
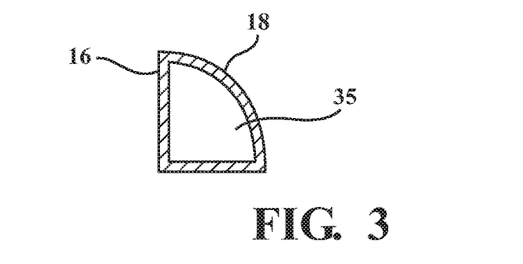
FIG. 3 is a cross-sectional view taken generally along the line 3-3 of the roof rail of FIG. 2.

Referring in more detail to the drawings, FIG. 1 illustrates a cargo carrying system 10 constructed in accordance with an aspect of the disclosure mounted to a body 12 of a motor vehicle 14. The cargo carrying system 10 includes a plurality of cargo support rails, referred to hereafter as rails 16, constructed in accordance with an aspect of the disclosure. The plurality of rails is shown as a pair of rails 16, by way of example and without limitation, laterally spaced from one another across a width of the motor vehicle 14 in generally parallel relation with one another to extend along opposite sides of the motor vehicle 14. The rails 16, as best shown in FIGS. 2 and 3, have a tubular wall 18 extending generally along a longitudinal axis 20 between opposite ends 22, 24. The tubular wall 18 is formed of a plurality of continuous carbon fibers 26 that extend unidirectionally with one another in continuous, uninterrupted (intended to mean unbroken) fashion from one of the opposite ends 22 to the other of the opposite ends 24, such that each carbon fiber 26 extends the full length of tubular wall 18, and a fibrous mat 28. The carbon fibers 26 and/or fibrous mat 28 can be impregnated and/or coated by a resin 30 that is ultimately cured during or subsequent to a pulltrusion process (FIG. 13) to provide the rails 16 with a lightweight, strong, durable, rigid, monolithic structure. The tubular wall 18, as shown in FIG. 3, can be formed being circumferentially continuous to bound a central hollow cavity 35 that extends from one end 22 to the opposite end 24. The opposite ends 22, 24 of the rails 16 are shown, by way of example and without limitation, being configured to be coupled to rear and front support members 32, 34, respectively, wherein the rear and front support members 32, 34 are in turn fixed to a roof panel 36 of the motor vehicle 14. In the embodiment of FIG. 1, the rails 16 are supported in raised and spaced fashion above the roof panel 36 by the rear and front support members 32, 34 to provide clearance between the rails 16 and the roof panel 36.

Figure 13:
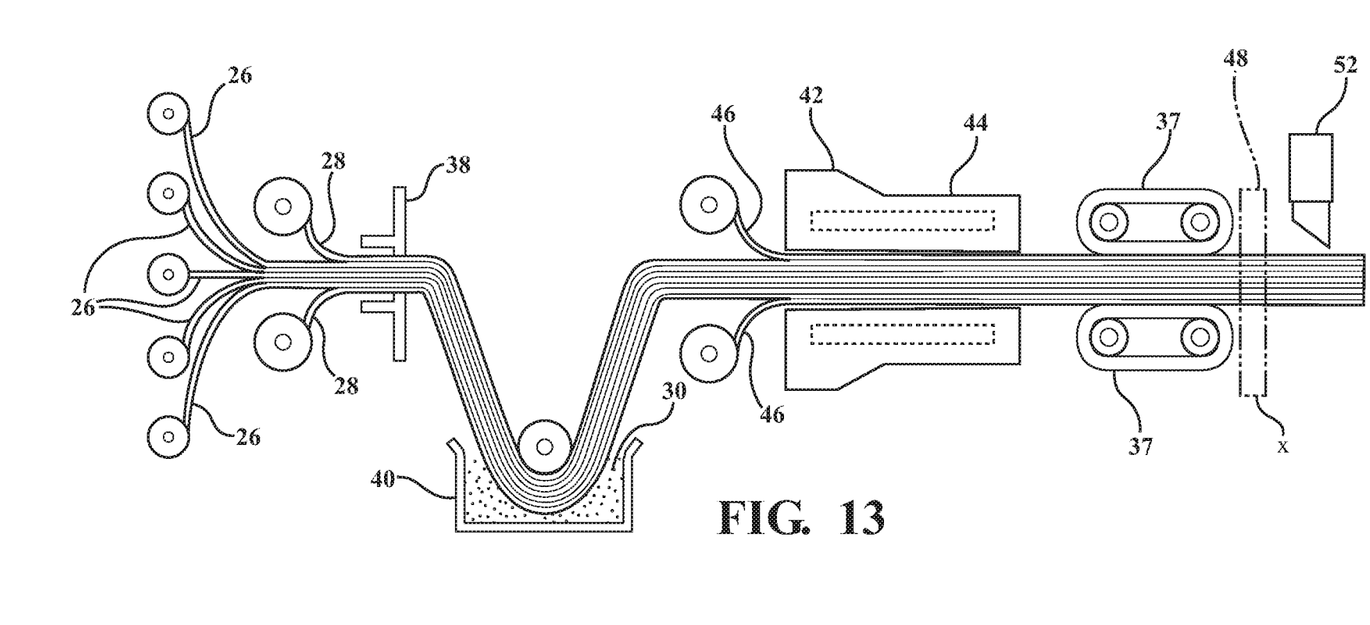
FIG. 13 is a schematic illustration of a pulltrusion process used to construct a cargo carrying system in accordance with another aspect of the disclosure.
Figure 14:
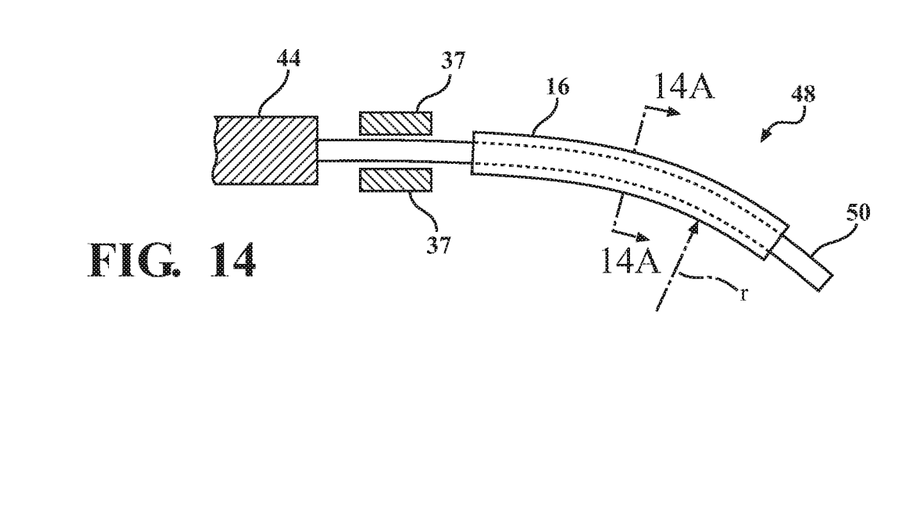
FIG. 14 is a schematic illustration of a shaping process used in combination with the process of FIG. 13 to construct a cargo carrying system in accordance with another aspect of the disclosure.
Figure 14A:
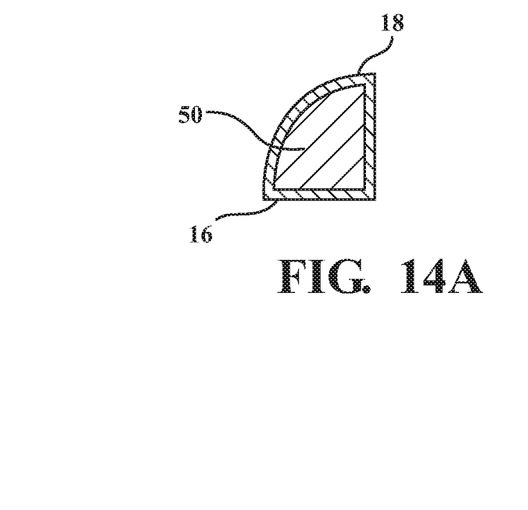
FIG. 14A is a cross-sectional view taken generally along the line 14A-14A of FIG. 14.

The rails 16, as mentioned above, can be formed in a pulltrusion process, with the carbon fibers 26 and fibrous mat(s) 28 being plied with one another and pulled along a substantial portion of the process via pullers 37, as illustrated in FIG. 13. In the non-limiting embodiment illustrated, a pair of fibrous mats 28 are provided, with the carbon fibers 26 being plied and sandwiched between the fibrous mats 28 prior to passing through a guide plate 38. As the carbon fibers 26 and mat 28 are being pulled via the pullers 37, they are merged (plied) with one another, such as through the guide plate 38, whereupon the carbon fibers 26 and fibrous mat 28 are then coated and/or preferably impregnated with a desired resin 30, such as in a resin bath 40, by way of example and without limitation, thereby enhancing the integrity of the bond between the carbon fibers 26 and fibrous mat 28 and the rigidity and strength of the finished rails 16. The material of fibrous mat 28 can be provided of any desired fibrous material, such as a fiberglass or carbon-fiber mat, for example, with the fibrous mat 28 including fibers typically having lengths between about 0.25-3.0 inches, by way of example and without limitation. The individual fibers within fibrous mat 28 are provided to extend in random directions relative to one another, both in parallel and non-parallel relation with one another and relative to the continuous carbon fibers 26. Upon being saturated with resin 30, the impregnated carbon fibers 26 and fibrous mat 28 are pulled into a preformer 42 and then through a heated die 44, wherein the heated die 44 can be appropriately shaped and contoured to provide the rails 16 having any desired outer peripheral contour, as viewed in lateral cross-section, such as shown in FIG. 3, by way of example and without limitation. It is to be understood that any desired lateral cross-section shape is contemplated herein, with desired outer peripheral shape extending uniformly from one end 22 to the opposite end 24. It is further contemplated herein that a surface veil 46 of desired outer surface material, whether an impervious film of polymeric material, scrim of non-woven material, or the like, can be disposed and plied along opposite sides of the carbon fibers 26 and fibrous mat(s) 28 prior to being pulled into the preformer 42, if desired. Accordingly, the resin impregnated carbon fibers 26 and fibrous mat 28, and surface veil 46, if provided, are heated and shaped as desired within the preformer 42 and the heated die 44 to take on a finished shape or at least an approximate finished shape of the rails 16. As such, upon exiting the heated die 44, the rails 16 can be provided to attain their finished shape. However, wherein further shaping is desired, it is further contemplated herein that the rails 16 can be further shaped in accordance with another aspect of the disclosure after being pulled out from the heated die 44. As such, if further shaping is intended, as discussed further below, the rails 16 are not fully cured upon exiting the heated die 44, as controlled via temperature and time within heated die 44, and thus, it is contemplated herein that the resin 30 can remain pliable and formable upon exiting the heated die 30, until being fully cured in a subsequent heating operation.

Wherein the rails 16 are desired to be shaped subsequent to exiting the heated die 44, the pullers 37, as shown in FIG. 13, can push or pull, shown as push, by way of example and without limitation, the heated and partially cooled rail 16 to a finish shaper 48 (shown at location "X" in FIG. 13 and shown by way of example in FIG. 14). The finish shaper 48 is shown as having an elongate member, such as a preformed pipe or rod 50 having the desired peripheral and elongate shape and contour, sized to be disposed within the cavity 35 of the rail 16, such that the wall 18 of the rail 16 extends about the rod 50. Accordingly, the rod 50 can be shaped having the desired cross-sectional shape and contour, such as that desired for the outer cross-sectional shape and contour of the finished rails 16, and having a constant lengthwise extending radius of curvature (r), if desired, thereby causing the rail 16 to take-on the desired radius of curvature (r) prior to the resin 30 being fully cured. Then, while on the rod 50, the resin 30 can be fully cured or substantially fully cured (meaning some curing may take place after being removed from the rod 50, with the rail 16 retaining the desired shapes and contours, thereby causing the rail 16 to attain a rigid shape of curvature corresponding to the radius of curvature (r) desired. Of course, the radius (r) can be selected as desired to best conform and mate with a radius curvature of the motor vehicle roof panel 36, or to simply provide the rail 16 with the desired finish shape.

Then, upon the rail 16 being shaped and cured, the rail 16 can be cut to finish length via a cutter 52, and then machined or otherwise processed, as desired, to provide any features, e.g. holes, to facilitate finish assembly of the rails 16 to the motor vehicle 14 and for subsequent mounting of crossbars (not shown) thereto. Of course, it is contemplated herein that the finish length of rail 16 could be cut prior to the curing process, if desired.

Figure 4:
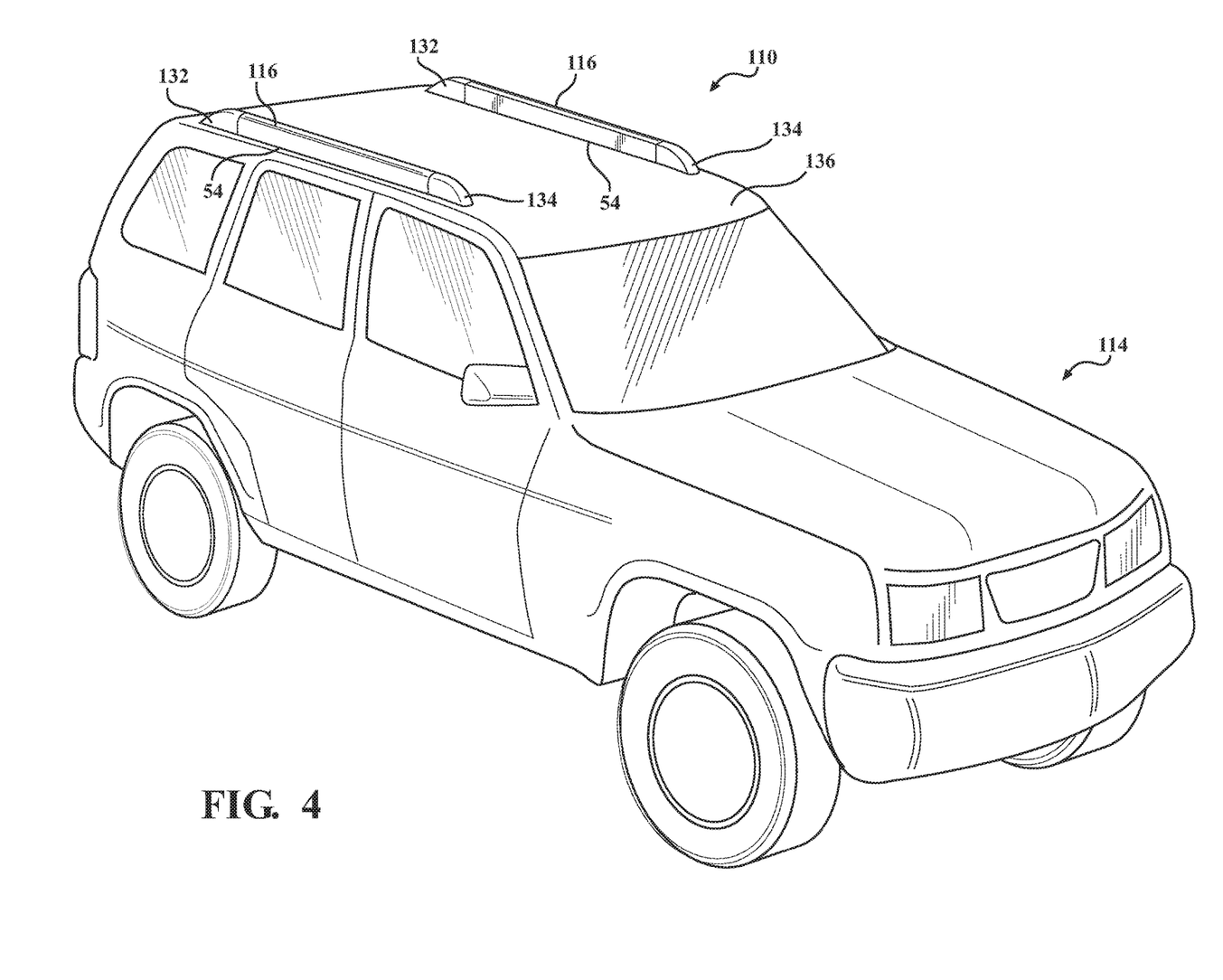
FIG. 4 is a perspective view of a motor vehicle including a cargo carrying system according to another aspect of the present disclosure.
Figure 5:
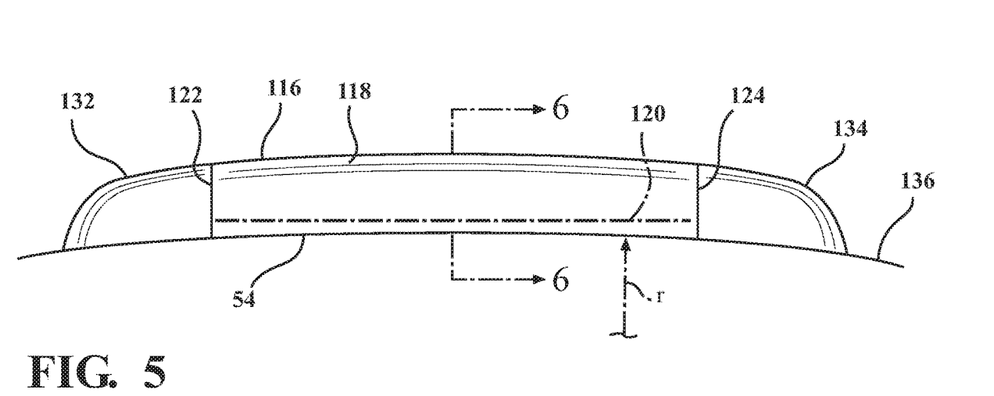
FIG. 5 is a side view of a roof rail of the cargo carrying system of FIG. 4.
Figure 6:
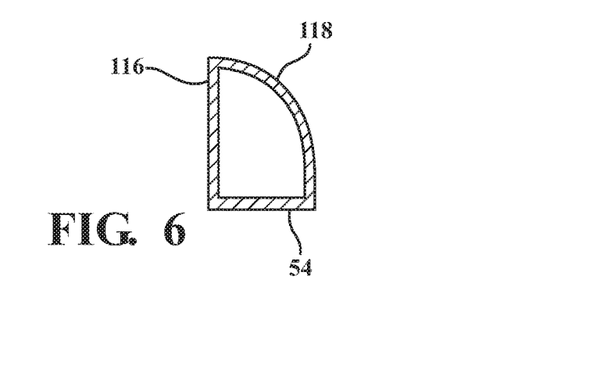
FIG. 6 is a cross-sectional view taken generally along the line 6-6 of the roof rail of FIG. 5.

FIG. 4 illustrates a cargo carrying system 110 constructed in accordance with another aspect of the disclosure, wherein the same reference numerals as used above, offset by a factor of 100, are used to identify like features of the cargo carry system 110 and motor vehicle 114 as described above for the cargo carrying system 10 and motor vehicle 14. The cargo carrying system 110 includes rails 116, which can be configured to be attached to rear and front support members 132, 134, such as discussed above; however, rather than the rear and front support members 132, 134 supporting the rails 116 in raised and spaced relation with a roof panel 136 of the motor vehicle 114, the rails 116 may be formed having a bottom surface 54 configured to extend in flush abutment with the roof panel 136 so that no space or gaps exist between rails 116 and roof panel 136. The rails 116, as best shown in FIGS. 5 and 6, may have a tubular wall 118 extending along a longitudinal axis 120 between opposite ends 122, 124. The tubular wall 118 may be formed via the pulltrusion process via the continuous carbon fibers 26, fibrous mat 28 and resin 30, as discussed above for the tubular wall 18, with the exception that the tubular wall 118 is formed having the bottom surface 54 configured to mate with the roof panel 136. It is to be recognized that the bottom surface 54 of the wall 118 can be formed to extend along a constant radius (r), arcuate path from one end 122 to the other end 124, as discussed above, with the radius (r) being adjustable in manufacture to conform with a radius of curvature of the roof panel 136. No further discussion is believed necessary, as one possessing ordinary skill in the art will readily understand how to alter the shape and contour of the rails 116 in view of the disclosure herein.

Figure 7:
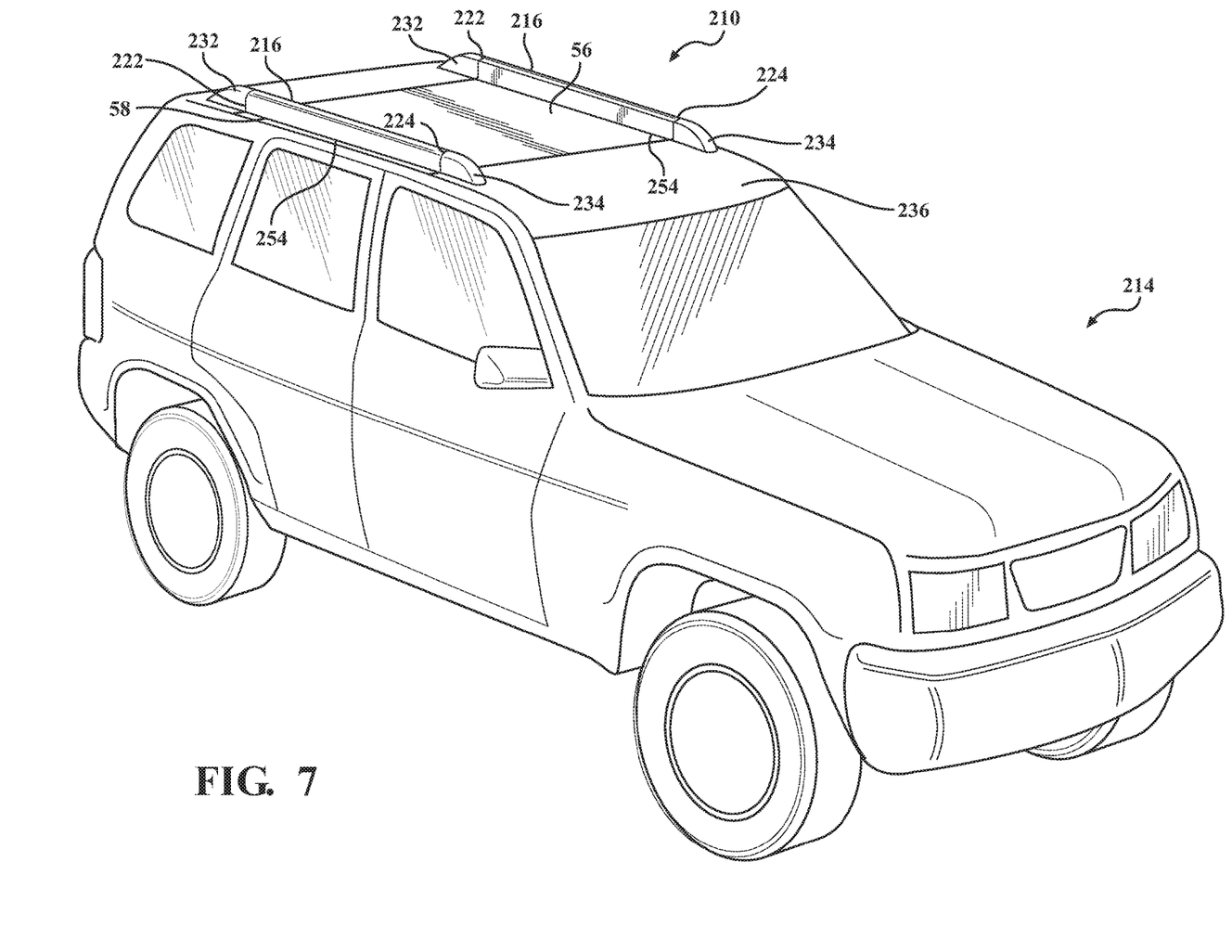
FIG. 7 is a perspective view of a motor vehicle including a cargo carrying system according to another aspect of the present disclosure.
Figure 8:
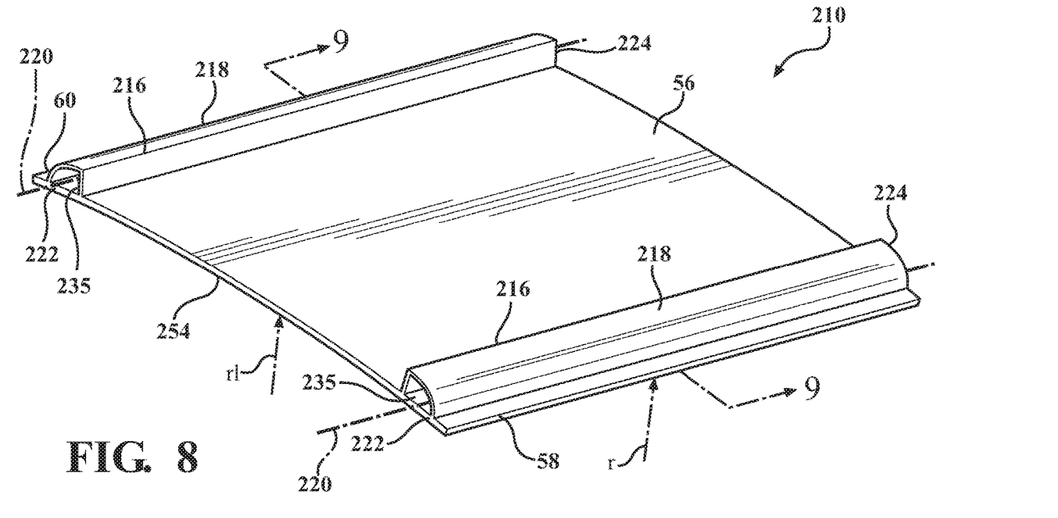
FIG. 8 is a perspective view of the cargo carrying system of the motor vehicle of FIG. 7.
Figure 9:
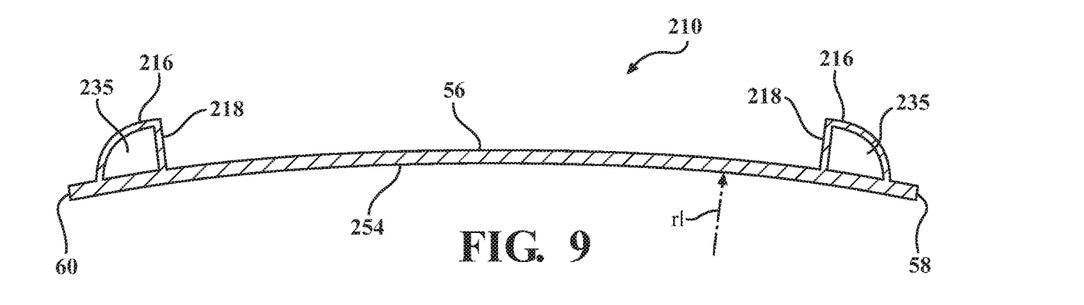
FIG. 9 is a cross-sectional view taken generally along the line 9-9 of the cargo carrying system of FIG. 8.
Figure 9A:
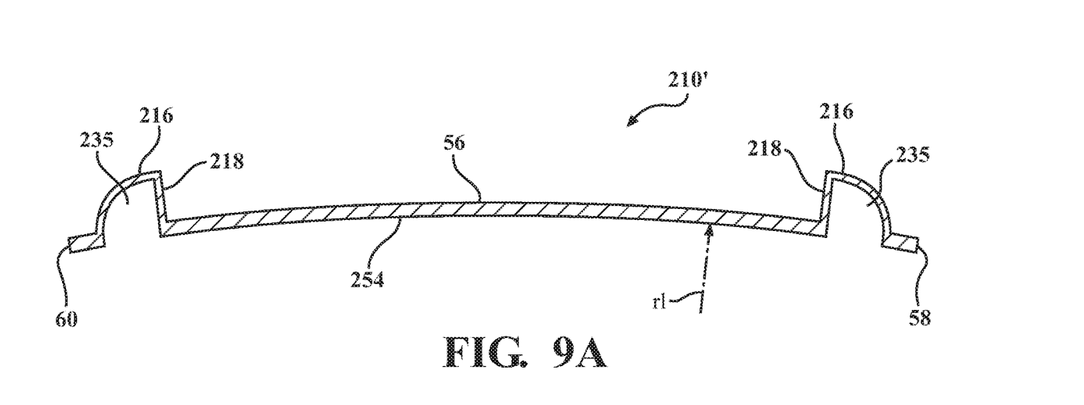
FIG. 9A is a view similar to FIG. 9 of a cargo carrying system according to another aspect of the present disclosure.

FIG. 7 illustrates a cargo carrying system 210 constructed in accordance with an aspect of the disclosure, wherein the same reference numerals as used above, offset by a factor of 200, are used to identify like features of the cargo carry system 210 and motor vehicle 214 as described above for the cargo carrying system 10 and motor vehicle 14. The cargo carrying system 210 includes rails 216 which can be configured for coupling attachment to rear and front support members 232, 234, such as discussed above, with the rails 216 being interconnected to one another via an integral, generally planar roof surface (generally planar is intended to mean that the roof surface is a sheet of material which can be purely or less than purely planar, but rather, can have concavity and convexity to some extent), referred to hereafter as roof wall 56. The interconnected rails 216 and roof wall 56 have a bottom surface 254 configured to extend in flush, mating abutment with a roof panel 236. The rails 216, as discussed above for the rails 16, 116, and as best shown in FIGS. 8 and 9, each have a tubular wall 218 extending parallel or generally parallel (generally is intended to mean a slight deviation, such as a few degrees, e.g. 0-10 degrees, to a longitudinal axis 220 between opposite ends 222, 224. The tubular walls 218, along with the roof wall 56, can be formed via a single pulltrusion process via the continuous carbon fibers 26, fibrous mat 28 and resin 30, as discussed above for the tubular wall 18, 118, with the continuous carbon fibers 26, fibrous mat 28 and resin 30 forming the tubular walls 216 and roof wall 56 as a single, monolithic piece of material. It is to be recognized that the bottom surface 254 of the tubular walls 218 and roof wall 56 can be formed to extend along a constant radius (r), arcuate path from the ends 222 to the opposite ends 224, as discussed above, with the radius (r) being adjustable in manufacture to conform with a lengthwise extending radius of curvature of the roof panel 236. Further yet, a predefined radius of curvature (r1) of the bottom surface 254 can be formed extending widthwise between opposite sides 58, 60 of the roof wall 56 to conform with an underlying roof subwall (not shown, being that the subwall is beneath the roof wall 56) of the motor vehicle 214. Accordingly, the bottom surface 254 can be formed being concave, planar, convex, or having a non-uniform contour, as desired. It is to be recognized that the desired contour of the bottom surface 254 can be formed via a support surface having the desired contour, upon which the bottom surface 254 of the cargo carrying system 210 can rest after exiting the heated die 44 and prior to the resin curing, as discussed above for rails 16. It is to be further recognized that in addition to the support surface along and on which the bottom surface 254 can rest, a pair of laterally spaced rods 50 could be disposed within cavities 235 of the rails 216 to facilitate forming the desired curvature of the rails 216. It is to further be recognized that the rail walls 218 could be formed being circumferentially discontinuous, if desired, such as shown in FIG. 9A for a rail system 210'. As such, the bottom surface 254 forming a floor of the rails 216 could be omitted, if desired, thereby forming a generally inverted C or U shaped wall, as viewed in the lateral cross-section of FIG. 9A, and thus, further reducing weight, material content and cost. No further discussion is believed necessary, as one possessing ordinary skill in the art will readily understand how to alter the shape and contour of the rails 216 and the roof wall 56 in view of the disclosure herein.

Figure 10:
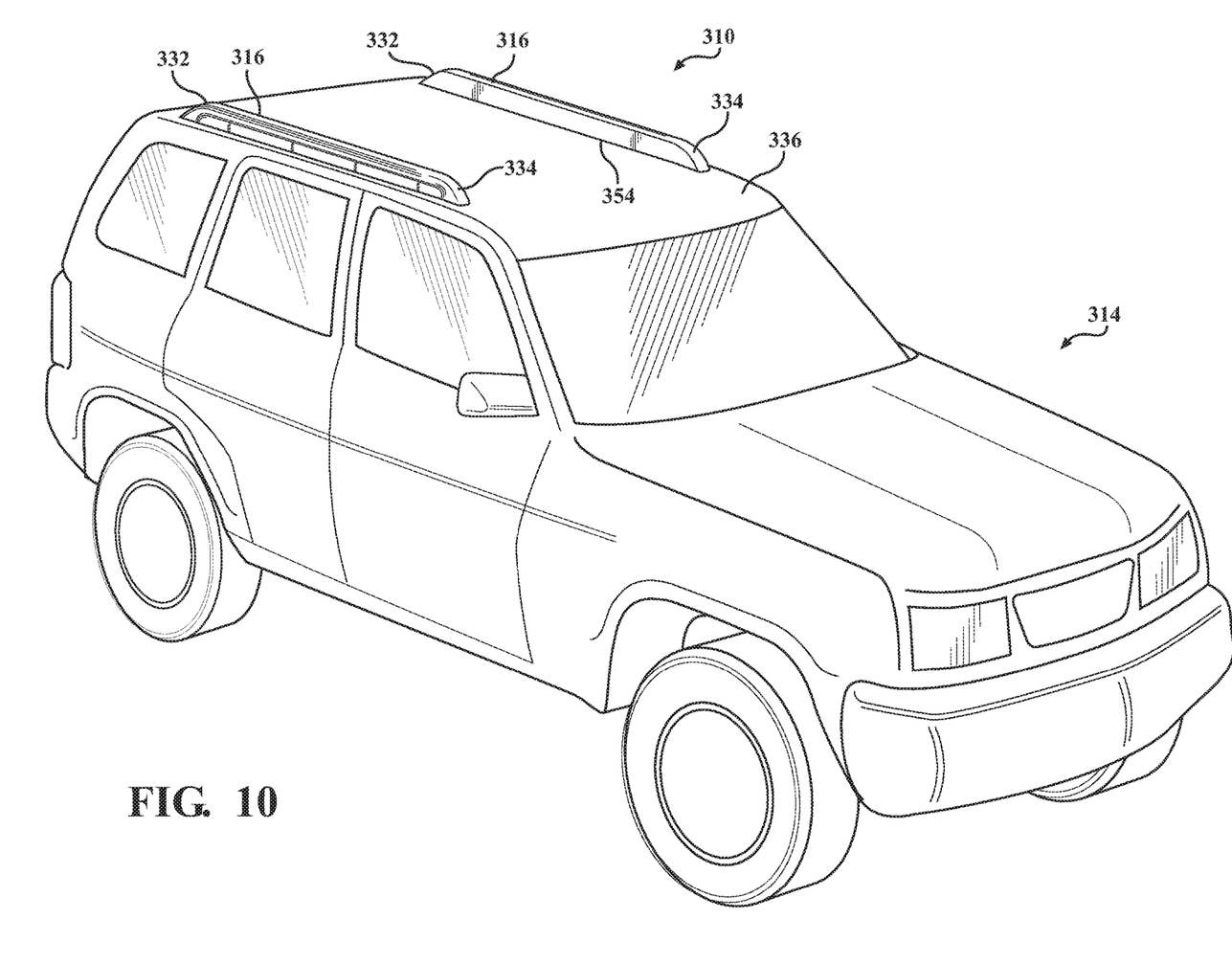
FIG. 10 is a perspective view of a motor vehicle including a cargo carrying system according to another aspect of the present disclosure.
Figure 11:
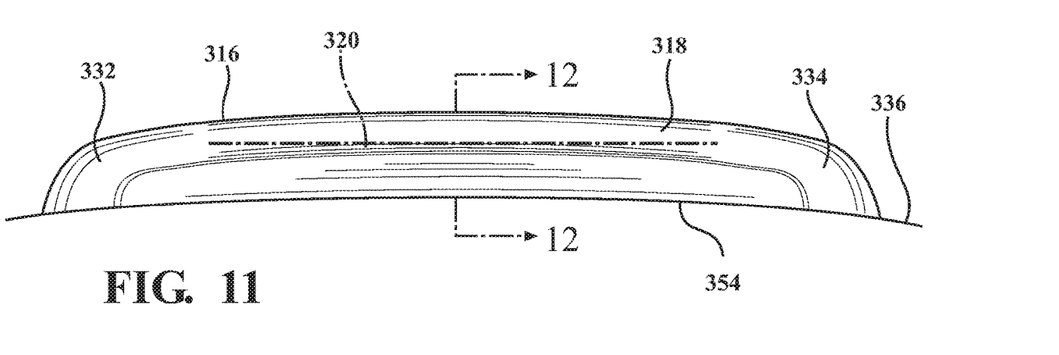
FIG. 11 is a side view of the roof rail of the cargo carrying system of FIG. 10.
Figure 12:
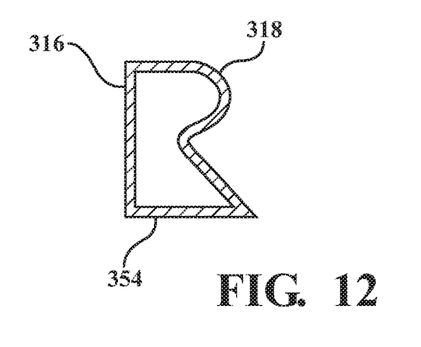
FIG. 12 is a cross-sectional view taken generally along the line 12-12 of the roof rail of FIG. 11.

FIG. 10 illustrates a cargo carrying system 310 constructed in accordance with yet another aspect of the disclosure, wherein the same reference numerals as used above, offset by a factor of 300, are used to identify like features of the cargo carry system 310 and motor vehicle 314, as discussed above for the cargo carrying system 10 and motor vehicle 14. The cargo carrying system 310 can include rails 316, which can be configured to extend between integral rear and front support members 332, 334, wherein the rear and front support members 332, 334 can be configured to support the rails 316 in raised and spaced relation with a roof panel 336 of the motor vehicle 314, or, as shown in FIG. 11, the rear and front support members 332, 334 and a bottom surface 354 of the rails 316 can be configured to extend in flush abutment with the roof panel 336. The rails 316, as best shown in FIG. 12, can have a tubular wall 318 extending along a longitudinal axis 320 between the rear and front support members 332, 334. The tubular wall 318 can be formed having any desired symmetrical or non-symmetrical circumferentially extending shape, as viewed in axial cross-section. A notable difference with the rails 316 is the incorporation of the integral rear and front support members 332, 334, wherein the rear and front support members 332, 334 can be formed as solid members having a different shape as viewed in axial cross-section from the tubular wall 318. This is made possible via a molding process used to construct the rails 316, such as an injection molding process, by way of example and without limitation, in contrast to the pulltrusion process discussed above. Accordingly, the molding process can be used to mold a mixture of chopped carbon fibers and resin, including an engineered thermoplastic material, to form the hollow tubular wall 318 and solid rear and front support members 332, 334 of the rails 316 as a single, monolithic piece of material having the desired cross-sectional shapes, which can be symmetrical or non-symmetrical in lateral cross-section along the longitudinal axis 320.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A cargo support rail for a motor vehicle cargo support system, comprising:
a tubular wall extending along a longitudinal axis between opposite ends, said tubular wall including a plurality of carbon fibers bonded to a fibrous mat by a cured resin.

2. The cargo support rail of claim 1, wherein said carbon fibers are continuous carbon fibers that extend from one of said opposite ends to the other of said opposite ends.

3. A cargo support rail for a motor vehicle cargo support system, comprising:
a tubular wall extending along a longitudinal axis between opposite ends, said tubular wall including a plurality of carbon fibers bonded to a fibrous mat by a cured resin, wherein said carbon fibers are continuous carbon fibers that extend from one of said opposite ends to the other of said opposite ends, and wherein said carbon fibers extend in unidirectional, parallel relation with one another.

4. The cargo support rail of claim 1, wherein said tubular wall has an outer surface extending along an arcuate path between said opposite ends.

5. The cargo support rail of claim 4, wherein said arcuate path of said outer surface extends from one of said opposite ends to the other of said opposite ends.

6. The cargo support rail of claim 4, wherein said arcuate path of said outer surface extends along a constant radius of curvature.

7. The cargo support rail of claim 4, wherein said outer surface forms an arcuate bottom surface of said tubular wall, said bottom surface being configured to abut a roof panel of the motor vehicle.

8. A cargo support rail for a motor vehicle cargo support system, comprising:
a tubular wall extending along a longitudinal axis between opposite ends, said tubular wall including a plurality of carbon fibers bonded to a fibrous mat by a cured resin, wherein said fibrous mat includes randomly oriented carbon fibers.

9. The cargo support rail of claim 1, wherein said plurality of carbon fibers are impregnated by said cured resin.

10. The cargo support rail of claim 1, wherein said fibrous mat includes a pair of fibrous mats, with said plurality of carbon fibers being sandwiched between said pair of fibrous mats.

11. The cargo support rail of claim 1, further including a front support member fixed to one of said opposite ends and a rear support member fixed the other of said opposite ends.

12. The cargo support rail of claim 3, wherein said tubular wall has an outer surface extending along an arcuate path between said opposite ends.

13. The cargo support rail of claim 12, wherein said arcuate path of said outer surface extends from one of said opposite ends to the other of said opposite ends.

14. The cargo support rail of claim 12, wherein said arcuate path of said outer surface extends along a constant radius of curvature.

15. The cargo support rail of claim 12, wherein said outer surface forms an arcuate bottom surface of said tubular wall, said bottom surface being configured to abut a roof panel of the motor vehicle.

16. The cargo support rail of claim 8, wherein said tubular wall has an outer surface extending along an arcuate path between said opposite ends.

17. The cargo support rail of claim 16, wherein said arcuate path of said outer surface extends from one of said opposite ends to the other of said opposite ends.

18. The cargo support rail of claim 16, wherein said arcuate path of said outer surface extends along a constant radius of curvature.

19. The cargo support rail of claim 16, wherein said outer surface forms an arcuate bottom surface of said tubular wall, said bottom surface being configured to abut a roof panel of the motor vehicle.

* * * * *